United States Patent
Jang (10) Patent No.: US 9,026,775 B2
(45) Date of Patent: May 5, 2015

(54) APPARATUS AND METHOD TO DRIVE DEVICES IN ORDER TO ENABLE RAPID BOOTING

(71) Applicant: Samsung Electronics Co., Ltd., Suwon-si, Gyeonggi-do (KR)

(72) Inventor: Dong-Jun Jang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/744,471

(22) Filed: Jan. 18, 2013

(65) Prior Publication Data

US 2013/0132714 A1     May 23, 2013

Related U.S. Application Data

(63) Continuation of application No. 12/259,480, filed on Oct. 28, 2008, now Pat. No. 8,380,970.

(30) Foreign Application Priority Data

Apr. 23, 2008   (KR) ........................ 10-2008-0037588

(51) Int. Cl.
*G06F 15/177* (2006.01)
*G06F 9/24* (2006.01)
*G06F 3/00* (2006.01)
*G06F 9/44* (2006.01)

(52) U.S. Cl.
CPC ............ *G06F 9/4401* (2013.01); *G06F 9/4416* (2013.01)

(58) Field of Classification Search
USPC ........................................................ 713/1, 2
See application file for complete search history.

(56) References Cited

U.S. PATENT DOCUMENTS

| | | | | |
|---|---|---|---|---|
| 5,598,563 | A * | 1/1997 | Spies ................................ | 713/2 |
| 5,848,367 | A * | 12/1998 | Lotocky et al. .................. | 701/36 |
| 6,523,082 | B1 * | 2/2003 | Yoshida ........................ | 710/313 |
| 6,539,473 | B1 | 3/2003 | Hubacher et al. | |
| 6,560,685 | B1 * | 5/2003 | Jackson ........................ | 711/165 |
| 6,990,573 | B2 | 1/2006 | Cherian et al. | |
| 7,055,024 | B2 * | 5/2006 | Khanna et al. ..................... | 713/1 |
| 7,257,652 | B2 | 8/2007 | Gilliam et al. | |
| 7,305,456 | B2 * | 12/2007 | Kobayashi .................... | 709/218 |
| 7,415,707 | B2 | 8/2008 | Taguchi et al. | |
| 7,584,374 | B2 | 9/2009 | Gu et al. | |
| 7,689,820 | B2 | 3/2010 | Pierce et al. | |
| 7,900,035 | B2 | 3/2011 | Yoshida et al. | |

(Continued)

FOREIGN PATENT DOCUMENTS

| | | |
|---|---|---|
| JP | 2000-242611 | 9/2000 |
| JP | 4215333 | 1/2009 |

(Continued)

OTHER PUBLICATIONS

Korean Office Action dated Apr. 14, 2014 issued in KR Application No. 10-2008-0037588.

(Continued)

*Primary Examiner* — Suresh Suryawanshi
(74) *Attorney, Agent, or Firm* — Staas & Halsey LLP (57) ABSTRACT

A device driving apparatus includes a storage unit to store a plurality of device driving programs, a plurality of devices to receive the plurality of device driving programs, and a switching unit to transfer the plurality of device driving programs.

19 Claims, 3 Drawing Sheets

(56) References Cited

U.S. PATENT DOCUMENTS

| | | |
|---|---|---|
| 2003/0056090 A1* | 3/2003 | Khanna et al. .................... 713/1 |
| 2008/0165288 A1 | 7/2008 | Miller |
| 2008/0209198 A1* | 8/2008 | Majni et al. ....................... 713/2 |
| 2008/0222313 A1* | 9/2008 | Andrus et al. .................. 710/10 |

FOREIGN PATENT DOCUMENTS

| | | |
|---|---|---|
| JP | 5261042 | 8/2013 |
| KR | 2006-0052523 | 5/2006 |

OTHER PUBLICATIONS

U.S. Office Action mailed Jul. 1, 2011, from U.S. Appl. No. 12/259,480.

U.S. Office Action mailed Nov. 9, 2011, from U.S. Appl. No. 12/259,480.

Notice of Allowance mailed Oct. 11, 2012, from U.S. Appl. No. 12/259,480.

U.S. Appl. No. 12/259,480, filed Oct. 28, 2008, Dong-jun Jang, Samsung Electronics Co., Ltd.

* cited by examiner

APPARATUS AND METHOD TO DRIVE DEVICES IN ORDER TO ENABLE RAPID BOOTING

CROSS-REFERENCE TO RELATED APPLICATIONS

This application is a Continuation application of prior application Ser. No. 12/259,480, filed on Oct. 28, 2008 in the United States Patent and Trademark Office, which claims priority under 35 U.S.C. §119 (a) from Korean Patent Application No. 10-2008-0037588, filed on Apr. 23, 2008, in the Korean Intellectual Property Office, the disclosure of which is incorporated herein by reference in its entirety.

BACKGROUND OF THE INVENTION

1. Field of the Invention

The present general inventive concept relates to an apparatus and method to drive devices. More particularly, the present general inventive concept relates to an apparatus and method to drive devices in order to enable rapid booting.

2. Description of the Related Art

Technical developments in video compression and data communication have led to an emergence of digital broadcasting which provides users with high-definition broadcasting. Additionally, the development of digital broadcasting has made receiving and processing various broadcast signals such as satellite broadcast, terrestrial broadcast or cable broadcast signals possible, and to provide users with the processed broadcast signals. Additionally, providing users with multiple additional services, for example bi-directional services or interface services between devices, or content protection services is possible.

In order to provide high-quality multifunctional digital broadcasting, devices including set-top boxes (STBs) may be booted or operated using respective individual programs and processors thereof.

If a number of flash memories increases to provide programs suitable for respective devices having respective processors thereof, the time required for booting may be reduced, but in an inefficient economical manner. Alternatively, if only a single flash memory is used to boot each of the devices having the respective processors thereof, the period of time required to boot the devices may be very long.

This problem may occur not only in STBs to provide digital broadcasting but in any electronic apparatuses including a plurality of devices having the respective processors thereof.

SUMMARY OF THE INVENTION

The present general inventive concept provides an apparatus and method to drive devices so as to rapidly boot the devices using a single storage unit.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a device driving apparatus including a storage unit to store a plurality of device driving programs, a plurality of devices to receive one of the plurality of device driving programs from the storage unit and to be booted using the received device driving program, and a switching unit to sequentially transfer the plurality of device driving programs to the plurality of devices.

While one of the plurality of device driving programs transferred to one of the plurality of devices is executed, the switching unit may transfer another device driving program to another device.

Each of the plurality of devices may include a processor to launch one of the plurality of device driving programs received from the storage unit.

The plurality of device driving programs may include a plurality of programs required to boot the plurality of devices and a plurality of programs required to operate the plurality of devices.

Each of the plurality of devices may receive one of the plurality of device driving programs directly from the storage unit.

One of the plurality of devices may be a control unit to control the switching unit to sequentially transfer the plurality of device driving programs to the plurality of devices.

If the plurality of devices are completely booted, the control unit may receive another device driving program for another device stored in the storage unit and transfer the received device driving program to the other device.

The storage unit may include a nonvolatile memory.

The foregoing and/or other aspects and utilities of the present general inventive concept may also be achieved by providing a device driving apparatus including a storage unit to store a plurality of device driving programs, at least one device driven by part of the plurality of device driving programs stored in the storage unit, and a control unit to control the plurality of device driving programs stored in the storage unit to be transferred sequentially to a processor built in the control unit and at least one processor disposed in the at least one device, the control unit being driven by part of the plurality of device driving programs stored in the storage unit.

The control unit may receive one of the plurality of device driving programs, and launch the received device driving program using the built-in processor. While one of the plurality of device driving programs is activated by the built-in processor, the control unit may control another device driving program to be transferred to the at least one device.

The foregoing and/or other aspects and utilities of the present general inventive concept may also be achieved by providing a device driving method, the method including transferring one of a plurality of device driving programs to one of a plurality of devices, and if the transferring is completed, booting the device using the received device driving program and simultaneously transferring another device driving program to another device.

The plurality of device driving programs may include a plurality of programs required to boot the plurality of devices and a plurality of programs required to operate the plurality of devices.

The foregoing and/or other aspects and utilities of the present general inventive concept may also be achieved by providing a set-top box (STB) usable with a display device, the set-top box including a storage unit, and a plurality of devices including respective processors thereof to share the single storage unit, wherein the devices receive boot programs from the storage unit sequentially to boot the devices.

The devices may include one or more of a broadcast receiving unit, a control unit and a graphical user interface generating unit.

The foregoing and/or other aspects and utilities of the present general inventive concept may also be achieved by providing a driving method of a set-top box, the method including sharing a single storage by devices including respective processors, and sequentially receiving boot programs from the storage unit to the devices to boot the devices.

The foregoing and/or other aspects and utilities of the present general inventive concept may also be achieved by providing a device driving system including a display device, and a set-top box (STB) to communicate with the display device, the STB including a storage unit, and a plurality of devices having respective processors thereof to share the single storage unit such that the devices receive boot programs from the storage unit sequentially to boot the devices.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
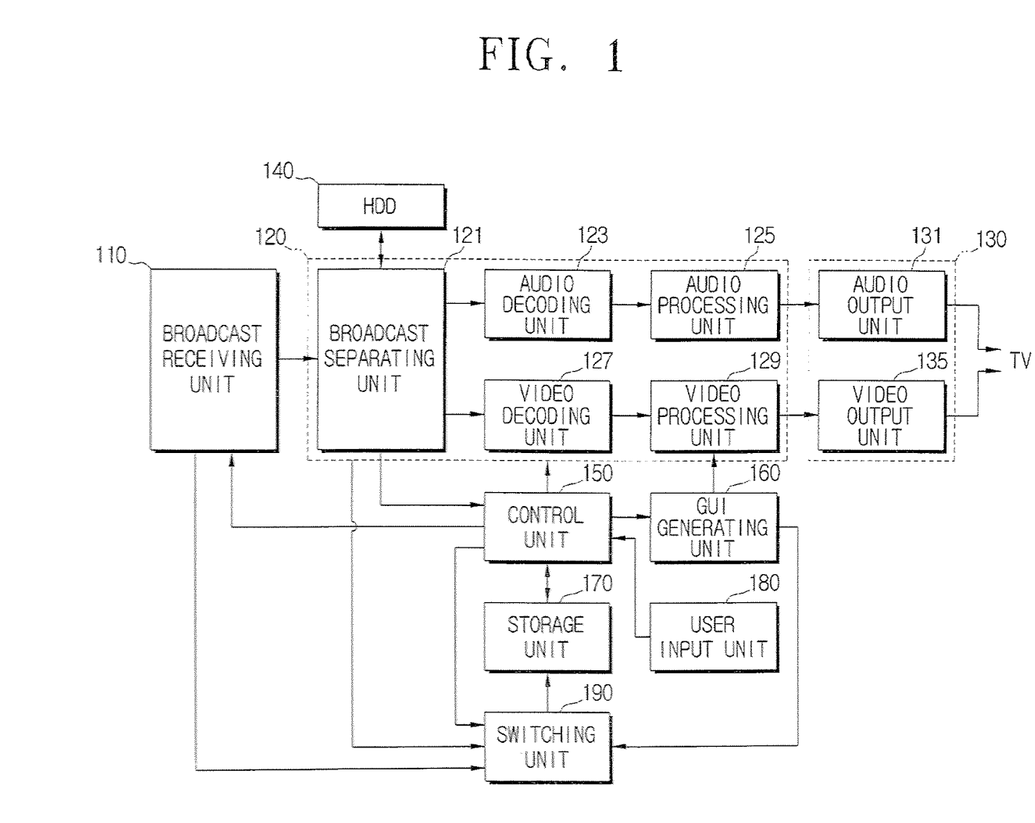
FIG. 1 illustrates a block diagram illustrating a set-top box (STB) to which the present general inventive concept is applicable.

FIG. 1 illustrates a block diagram illustrating a set-top box (STB) to which the present general inventive concept is applicable. The STB restores a compressed digital broadcast signal received from an external source, and sends the restored digital broadcast signal to a television (TV), so that a user is able to use content such as video, sound, Internet web pages or games.

The STB of FIG. 1 includes a broadcast receiving unit 110, a broadcast processing unit 120, a broadcast output unit 130, a hard disk drive (HDD) 140, a control unit 150, a graphical user interface (GUI) generating unit 160, a storage unit 170, a user input unit 180 and a switching unit 190. It is possible that a display (or a TV) can be connected to the STB to display an image and/or generate sound according to signals output from the STB. It is also possible that the display and the STB can be formed and disposed in a single integrated body. It is also possible that the display and the STB can be connected to each other through a communication line.

The broadcast receiving unit 110 receives a broadcast via a cable and/or wirelessly, and tunes to and demodulates the received broadcast. The broadcast receiving unit 110 may receive a terrestrial, satellite, or cable broadcast, so there is no limitation to the type of received broadcast. Additionally, the broadcast receiving unit 110 includes a tuner to tune to a desired broadcast.

The broadcast receiving unit 110 includes a processor thereof to boot the broadcast receiving unit 110 and to receive, tune to and demodulate the broadcast.

The broadcast receiving unit 110 transfers the demodulated broadcast to the broadcast processing unit 120.

The broadcast processing unit 120 performs signal processing on the broadcast signal output from the broadcast receiving unit 110. The broadcast processing unit 120 includes a broadcast separating unit 121, an audio decoding unit 123, an audio processing unit 125, a video decoding unit 127 and a video processing unit 129.

The broadcast separating unit 121 separates the broadcast signal output from the broadcast receiving unit 110 into an audio signal and a video signal, and transfers the audio signal and the video signal to the audio decoding unit 123 and to the video decoding unit 127, respectively, so that the audio signal and the video signal are used to provide a broadcast program.

The audio decoding unit 123 decodes the audio signal output from the broadcast separating unit 121, and outputs the decompressed audio signal.

The audio processing unit 125 converts the decoded audio signal output from the audio decoding unit 123 into an audio signal of a format suitable for transmission to the TV connected to the STB. In order to achieve a format suitable for transmission, the audio processing unit 125 performs digital-to-analog (D/A) conversion on the decoded audio signal.

The audio processing unit 125 transfers the converted audio signal to an audio output unit 131.

The video decoding unit 127 decodes the video signal output from the broadcast separating unit 121, so that the decompressed video signal can be output.

The video processing unit 129 performs signal processing on the decoded video signal output from the video decoding unit 127.

The video processing unit 129 transfers the processed video signal to a video output unit 135.

The broadcast processing unit 120 includes a processor thereof to boot the broadcast separating unit 121, audio decoding unit 123, audio processing unit 125, video decoding unit 127 and video processing unit 129, and to separate the broadcast signal, decode and process the separated signals.

The processor of the broadcast processing unit 120 may be the audio processing unit 125 or the video processing unit 129. Alternatively, the broadcast separating unit 121, audio decoding unit 123, audio processing unit 125, video decoding unit 127 and video processing unit 129 may include respective processors thereof individually. In this situation, if the power is applied to the STB, the broadcast separating unit 121, audio decoding unit 123, audio processing unit 125, video decoding unit 127 and video processing unit 129 may be booted separately using respective processors thereof.

Alternatively, the broadcast processing unit 120 may include a single composite processor, in addition to the broadcast separating unit 121, audio decoding unit 123, audio processing unit 125, video decoding unit 127 and video processing unit 129.

If the broadcast processing unit 120 includes a single composite processor, the processor may boot devices contained in the broadcast processing unit 120, and may separate a broadcast signal and decode and process the separated signals.

For convenience of description, the present general inventive concept is applied to a situation in which the broadcast processing unit 120 includes a single composite processor.

The GUI generating unit 160 generates a GUI to be displayed on a screen of the TV connected to the STB under control of the control unit 150. The GUI generated by the GUI generating unit 160 is a sort of display information which is displayed to provide an interface between a user and the STB. The GUI generating unit 160 may generate a GUI to receive a user command, for example, an electronic program guide (EPG) screen, or a GUI to inform the operating state of the STB.

The GUI generating unit 160 includes a processor thereof to boot the GUI generating unit 160 and to generate a GUI to be displayed on the screen of the TV.

The GUI generated by the GUI generating unit 160 is transferred to the video processing unit 129, and is then superimposed over video output from the video decoding unit 127.

The broadcast output unit 130 includes the audio output unit 131 and video output unit 135 to transfer the audio signal and video signal output from the broadcast processing unit 120 to the TV. Accordingly, the TV may output video and audio received from the STP through a display and a speaker, respectively.

The HDD 140 stores the broadcast, which is received and transferred by the broadcast receiving unit 110 via the broadcast separating unit 121. The broadcast received from the broadcast receiving unit 110 may be stored in the HDD 140, transferred to the broadcast separating unit 121 and played back, or may be directly transferred to the broadcast separating unit 121 without being stored in the HDD 140.

The user input unit 180 transfers user commands input by buttons on a front panel of the STB and by a remote controller to the control unit 150. The control unit 150 controls an entire operation of the STB according to the user commands received from the user input unit 180.

In more detail, the control unit 150 controls the broadcast receiving unit 110 to receive a broadcast provided via a channel selected by the user, and also controls the broadcast processing unit 120 to process the broadcast signal output from the broadcast receiving unit 110.

Additionally, the control unit 150 controls the GUI generating unit 160 to generate a GUI so that the GUI is displayed on the screen of the TV connected to the STB.

The control unit 150 includes a respective processor thereof to boot the control unit 150 and to control the overall operation of the STB.

The control unit 150 controls the storage unit 170 and the switching unit 190, so that one of a plurality of programs stored in the storage unit 170 is transferred to one of the processors contained in the broadcast receiving unit 110, broadcast processing unit 120, control unit 150 and GUI generating unit 160, respectively, according to a switching operation of the switching unit 190.

The storage unit 170 stores a plurality of boot programs, a plurality of operation programs, and data and information required for the operations of the STB. Here, the boot programs and operation programs are required by the control unit 150 in order to boot the STB and control the entire operation of the STB.

Specifically, the boot programs stored in the storage unit 170 include a boot program to boot the broadcast receiving unit 110, a boot program to boot the broadcasting processing unit 120, a boot program to boot the control unit 150 and a boot program to boot the GUI generating unit 160.

In order to store the respective boot programs, the storage unit 170 may be implemented as a nonvolatile memory, namely, a flash memory.

Additionally, the operation programs stored in the storage unit 170 include operation programs to perform the above-described operations of the broadcast receiving unit 110, broadcasting processing unit 120, control unit 150 and GUI generating unit 160.

Under the control of the control unit 150, the switching unit 190 performs the switching operation so that one of the plurality of boot programs stored in the storage unit 170 is transferred to one of the processors contained in the broadcast receiving unit 110, broadcast processing unit 120, control unit 150 and GUI generating unit 160, respectively.

Hereinafter, this process of transferring the boot programs of the STB according to the switching operation will be described in detail with reference to FIGS. 2 and 3.

In more detail, the configuration and state of the devices contained in the STB which are connected to perform booting according to the switching operation will be described with reference to FIG. 2, and a process of booting each of the devices in the STB will be described with reference to FIG. 3.

Additionally, in order to simplify the description and facilitate understanding of the present general inventive concept, a process of transferring a boot program to the broadcast processing unit 120 will be omitted, and only processes of transferring boot programs to the broadcast receiving unit 110, control unit 150 and GUI generating unit 160 will be described hereinafter.

Figure 2:
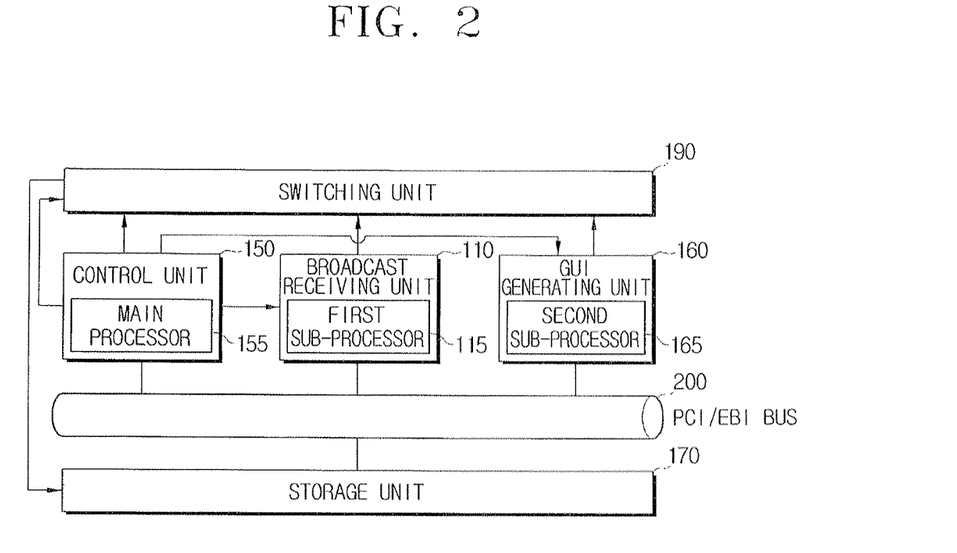
FIG. 2 illustrates a detailed block diagram illustrating devices in order to perform booting depending on a switching operation according to an exemplary embodiment of the present general inventive concept.

FIG. 2 illustrates a detailed block diagram of the devices in the STB for a booting operation depending on the switching operation according to the exemplary embodiment of the present general inventive concept.

The devices may be the broadcast receiving unit 110, control unit 150, GUI generating unit 160, storage unit 170, switching unit 190 and a Peripheral Component Interconnect (PCI)-Expansion Bus Interface (EBI) bus 200.

As described above, the storage unit 170 may be a nonvolatile memory, namely, a flash memory, and stores the boot programs to boot the broadcast receiving unit 110, control unit 150 and GUI generating unit 160 and the operation programs to perform operations of the broadcast receiving unit 110, control unit 150 and GUI generating unit 160.

The storage unit 170 transfers one of the programs to the broadcast receiving unit 110 or control unit 150 or GUI generating unit 160 via the PCI-EBI bus 200, in response to a program request signal selected by the switching unit 190.

The program request signal may be a boot program request signal or an operation program request signal.

The boot program request signal may include signals to request the boot programs suitable for the broadcast receiving unit 110, control unit 150 and GUI generating unit 160, respectively. Each of the signals may be output from the broadcast receiving unit 110, control unit 150 and GUI generating unit 160.

The operation program request signal may include signals to request the operation programs suitable for the broadcast receiving unit 110, control unit 150 and GUI generating unit 160, respectively. Each of the signals may be output from the broadcast receiving unit 110, control unit 150 and GUI generating unit 160.

The broadcast receiving unit 110 includes a first sub-processor 115 as a processor thereof. The first sub-processor 115 boots the broadcast receiving unit 110 and receives, tunes to and demodulates a broadcast.

Before the STB is completely booted, the broadcast receiving unit 110 receives a boot program for the broadcast receiving unit 110 stored in the storage unit 170 via the PCI-EBI bus 200.

If the broadcast receiving unit 110 receives the boot program, the first sub-processor 115 boots the broadcast receiving unit 110 using the received boot program.

After the STB is completely booted, the broadcast receiving unit 110 then receives an operation program for the broadcast receiving unit 110 stored in the storage unit 170 through the control unit 150. In more detail, the control unit 150 receives the operation program for the broadcast receiving unit 110 from the storage unit 170 via the PCI-EBI bus 200, and transfers the received program to the broadcast receiving unit 110.

If the broadcast receiving unit 110 receives the operation program, the first sub-processor 115 performs operations of receiving, tuning and demodulating a broadcast using the received operation program.

The broadcast receiving unit 110 transfers a program request signal to the switching unit 190 in order to receive the boot program or the operation program for the broadcast receiving unit 110.

In response to the program request signal, the switching unit 190 transfers one of the boot programs stored in the storage unit 170 to one of the processor of the broadcast receiving unit 110, the processor of the control unit 150 and the processor of the GUI generating unit 160.

The GUI generating unit 160 includes a second sub-processor 165 as a processor thereof. The second sub-processor 165 boots the GUI generating unit 160 and generates a GUI to be displayed on the screen of the TV.

Before the STB is completely booted, the GUI generating unit 160 receives a boot program for the GUI generating unit 160 stored in the storage unit 170 via the PCI-EBI bus 200.

In response to the boot program for the GUI generating unit 160, the second sub-processor 165 boots the GUI generating unit 160 using the received boot program.

After the STB is completely booted, the GUI generating unit 160 receives an operation program for the GUI generating unit 160 from the storage unit 170 through the control unit 150. In more detail, the control unit 150 receives the operation program for the GUI generating unit 160 from the storage unit 170 via the PCI-EBI bus 200, and transfers the received operation program to the GUI generating unit 160.

If the GUI generating unit 160 receives the operation program, the second sub-processor 165 generates a GUI to be displayed on the screen of the TV using the received operation program.

The GUI generating unit 160 transfers a program request signal to the switching unit 190 in order to receive the boot program or operation program for the GUI generating unit 160.

The control unit 150 includes a main processor 155 as a processor thereof. The main processor 155 boots the control unit 150 and controls the entire operation of the STB.

The control unit 150, before the STB is completely booted, receives a boot program for the control unit 150 stored in the storage unit 170 via the PCI-EBI bus 200.

If the control unit 150 receives the boot program from the storage unit 170, the main processor 155 boots the control unit 150 using the received boot program.

After completely booting the STB, the control unit 150 receives an operation program for the control unit 150 stored in the storage unit 170 through the PCI-EBI bus 200.

The control unit 150 receives not only the operation program for the control unit 150, but also the operation program for the broadcast receiving unit 110 and the operation program for the GUI generating unit 160.

The main processor 155 controls the entire operation of the STB using the received operation program for the control unit 150. The control unit 150 transfers the received operation programs of the broadcast receiving unit 110 and GUI generating unit 160 to the broadcast receiving unit 110 and GUI generating unit 160, respectively.

The broadcast receiving unit 110, control unit 150, GUI generating unit 160 and the storage unit 170 are mutually connected via the PCI-EBI bus 200.

A PCI bus refers to a circuit to mutually connect a plurality of devices so that users are able to share multiple lines. An EBI refers to a circuit provided to share multiple lines by mutually connecting devices with low processing rate.

Accordingly, the PCI-EBI bus 200 implemented by combining the PCI bus and EBI in the exemplary embodiment of the present general inventive concept may be provided to transceive messages or information among the broadcast receiving unit 110, control unit 150, GUI generating unit 160 and the storage unit 170 which are connected mutually.

While the PCI bus and EBI are combined in the exemplary embodiment of the present general inventive concept, this is merely an example for convenience of description. Accordingly, the present general inventive concept is equally applicable to a situation in which the PCI bus is operated separately from the EBI.

The control unit 150 transfers to the switching unit 190 a program request signal to receive the boot program or operation program for the control unit 150.

The control unit 150 controls the switching unit 190 so that the boot programs stored in the storage unit 170 are sequentially transferred to the main processor 155, first sub-processor 115 and second sub-processor 165.

Hereinafter, this process of sequentially transferring the boot programs will be described in detail with reference to FIG. 3.

Figure 3:
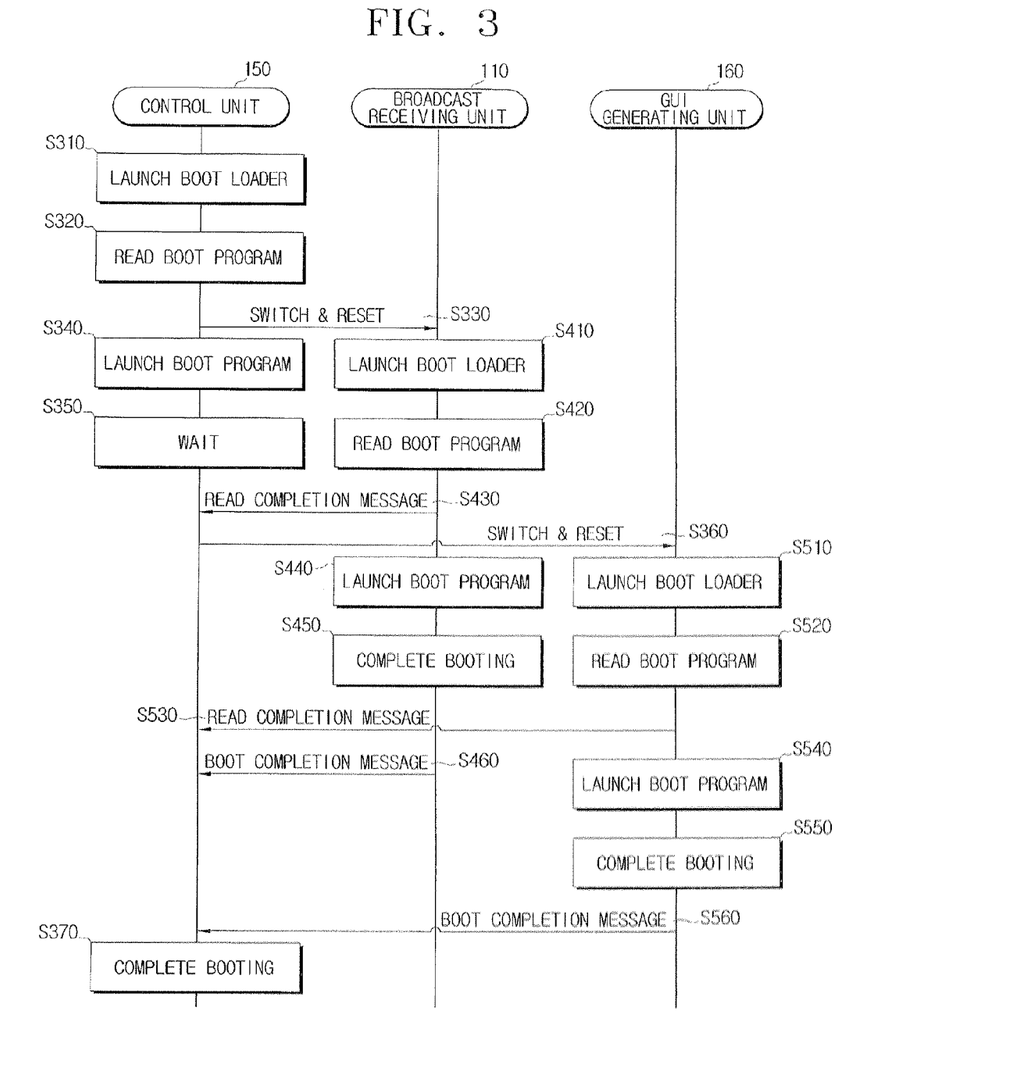
FIG. 3 is a flowchart illustrating a process of booting an STB according to an exemplary embodiment of the present general inventive concept.

FIG. 3 is a flowchart illustrating a process of booting the STB according to the exemplary embodiment of the present general inventive concept.

If the power is applied to the STB, the control unit 150 controls the switching unit 190 so that a boot loader is read from the storage unit 170, and the main processor 155 of the control unit 150 then executes the read boot loader in operation S310.

The boot loader refers to a program to find where the boot program is stored in the storage unit 170, in order to read the boot program when the STB is turned on. Accordingly, the boot loader may be used to search the storage unit 170 for a boot block in which the boot program is stored.

If the boot block is found by launching the boot loader, the control unit 150 controls the switching unit 190, so that the boot program for the control unit 150 is read from the storage unit 170 in operation S320.

If the boot program for the control unit 150 is completely read, there is no need for the control unit 150 to use the storage unit 170. In more detail, since the boot program for the control unit 150 has been already read, no program may be read from the storage unit 170 until the control unit 150 is booted.

The control unit 150 causes the switching unit 190 to switch permission to use the storage unit 170 to the first sub-processor 115 of the broadcast receiving unit 110 from the main processor 155, and resets the broadcast receiving unit 110 in operation S330.

In more detail, the switching operation causes a program request signal associated with a specific device to be selected from among program request signals transferred from all devices to the switching unit 190 according to the control of the control unit 150.

For example, if permission to use the storage unit 170 is switched to the first sub-processor 115 from the main processor 155 after completion of reading the boot program for the control unit 150, the control unit 150 controls the switching unit 190 so that a signal to request the boot program for the broadcast receiving unit 110 is selected from among the program request signals transferred from all the devices to the switching unit 190.

After permission to use the storage unit 170 is switched to the first sub-processor 115, the main processor 155 launches the read boot program for the control unit 150 without any connection to the storage unit 170 in operation S340.

To execute the read boot program for the control unit 150, the control unit 150 may further include a memory, such as a synchronous dynamic random access memory (SDRAM).

In more detail, the main processor 155 connected to the storage unit 170 may read the boot program for the control unit 150, and may store the read boot program in the SDRAM. After this reading operation, the main processor 155 may execute the boot program stored in the SDRAM.

Therefore, the main processor 155 may launch the boot program for the control unit 150 that was stored in the storage unit 170 even when permission to use the storage unit 170 is not switched to the main processor 155.

If the main processor 155 finishes launching of the read boot program for the control unit 150, the control unit 150 waits until devices other than the control unit 150 are completely booted in operation S350.

The first sub-processor 115, to which permission to use the storage unit 170 was switched in operation S330, reads the boot loader from the storage unit 170 and launches the read boot loader in operation S410.

If the boot loader is launched and the boot block is found, the control unit 150 controls the switching unit 190 so that the boot program for the broadcast receiving unit 110 is read from the storage unit 170 by the broadcast receiving unit 110 in operation S420.

Subsequently, if the boot program for the broadcast receiving unit 110 is completely read, the broadcast receiving unit 110 transmits a read completion message notifying that reading of the boot program has finished to the control unit 150 in operation S430.

In response to the read completion message from the broadcast receiving unit 110, the control unit 150 determines whether there are any devices for which boot programs need to be read.

If a determination is made that the boot program for the GUI generating unit 160 has not yet been read, the control unit 150 causes the switching unit 190 to switch permission to use the storage unit 170 to the second sub-processor 165 of the GUI generating unit 160 from the first sub-processor 115, and resets the GUI generating unit 160 in operation S360.

After permission to use the storage unit 170 is switched to the second sub-processor 165, the first sub-processor 115 launches the read boot program for the broadcast receiving unit 110 without any connection to the storage unit 170 in operation S440.

To execute the read boot program for the broadcast receiving unit 110, the broadcast receiving unit 110 may further include a memory, such as an SDRAM.

Subsequently, if the read boot program for the broadcast receiving unit 110 is executed in operation S440 and if the broadcast receiving unit 110 is completely booted in operation S450, the broadcast receiving unit 110 transmits a boot completion message to the control unit 150 in operation S460.

The second sub-processor 165, to which permission to use the storage unit 170 has been switched in operation S360, reads the boot loader from the storage unit 170 and launches the read boot loader in operation S510.

If the boot block is found after the boot loader is executed, the control unit 150 controls the switching unit 190 so that the boot program for the GUI generating unit 160 is read from the storage unit 170 by the GUI generating unit 160 in operation S520.

Subsequently, if the boot program for GUI generating unit 160 is completely read, the GUI generating unit 160 transmits a read completion message notifying that reading of the boot program has finished to the control unit 150 in operation S530.

In response to the read completion message from the GUI generating unit 160, the control unit 150 determines whether there are any devices for which boot programs need to be read.

If there are no devices that are determined to have boot programs needing to be read, the control unit 150 waits until the broadcast receiving unit 110 and GUI generating unit 160 are completely booted.

If the boot program for the GUI generating unit 160 is executed in operation S540 and thereby the GUI generating unit 160 is completely booted in operation S550, the GUI generating unit 160 sends a boot completion message to the control unit 150 in operation S560.

In response to the boot completion messages from both the broadcast receiving unit 110 and GUI generating unit 160, the control unit 150 finally finishes booting the STB in operation S370.

Accordingly, booting the devices in the STB more rapidly is possible.

After completely booting the STB, the broadcast receiving unit 110, control unit 150 and GUI generating unit 160 respectively receive appropriate operation programs stored in the storage unit 170.

Therefore, it is possible for the broadcast receiving unit 110 can receive a broadcast and tune to and demodulate the received broadcast, the GUI generating unit 160 can generate a GUI to be displayed on the screen of the TV, and the control unit 150 can control the entire operation of the STB.

The operation programs may be transferred through the control unit 150 in a different manner from the process of booting the STB.

In more detail, the operation programs for the broadcast receiving unit 110, control unit 150 and GUI generating unit 160 stored in the storage unit 170 are all transferred to the control unit 150 via the PCI-EBI bus 200.

The main processor 155 of the control unit 150 then launches the received operation program for the control unit 150. Similarly, the control unit 150 causes the operation programs for the broadcast receiving unit 110 and GUI generating unit 160 to be transferred to the broadcast receiving unit 110 and GUI generating unit 160, respectively, so that the transferred operation programs are launched by the first sub-processor 115 and second sub-processor 165.

This is merely an example to facilitate understanding of the present general inventive concept, and accordingly causing the operation programs stored in the storage unit 170 to be transferred to each corresponding device via the PCI-EBI bus 200 without being transferred to the control unit 150 is possible, in the same manner as the process of booting the STB.

While only the broadcast receiving unit 110, broadcast processing unit 120, control unit 150 and GUI generating unit 160 include respective processors thereof to facilitate understanding of the present general inventive concept, there is no limitation thereto. Accordingly, aspects of the present general inventive concept are equally applicable to a situation in which all devices in the STB have respective processors thereof.

Additionally, the STB that is a sort of broadcast receiving apparatuses, is used an apparatus to drive the devices in the present general inventive concept, but there is limited to the STB. Accordingly, aspects of the present general inventive concept are equally applicable to all electronic apparatuses requiring booting, for example a personal computer (PC) or a digital television (DTV).

Furthermore, three devices are booted in the present general inventive concept, but this is merely an example for convenience of description. Therefore, aspects of the present general inventive concept are also applicable to a situation in which two or four devices are booted.

Moreover, the boot programs and operation programs are used as driving programs in the present general inventive concept, but this is merely an example for convenience of description. Accordingly, aspects of the present general inventive concept are also applicable to a situation in which boot programs and operation programs are not divided logically or a situation in which programs to drive various devices are not divided logically.

As described above, according to the present general inventive concept, since a plurality of devices include respective processors thereof which share a single storage unit, the devices may receive boot programs from the storage unit sequentially so that rapid booting of the devices is possible. Additionally, the plurality of processors share only a single storage unit rather than a plurality of storage units, reducing the unit cost of production is possible, thereby providing economic benefits.

Although various embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An apparatus comprising:
   a plurality of devices;
   a storage unit to store a plurality of device driving programs corresponding to the plurality of devices that are bootable;
   a control unit configured to upload the plurality of device driving programs from the storage unit to the plurality of devices, each of the plurality of devices configured to generate a program request signal which is used by the control unit to upload a corresponding one of the device driving programs,
   wherein, while one of the plurality of device driving programs is being transferred to one of the plurality of devices, the control unit transfers another device driving program to another one of the plurality of devices.

2. The apparatus as claimed in claim 1, wherein each of the plurality of devices is configured to launch one of the plurality of device driving programs received from the storage unit.

3. The apparatus as claimed in claim 1, wherein the plurality of device driving programs comprise:
   a plurality of programs required to boot the plurality of devices and a plurality of programs required to operate the plurality of devices.

4. The apparatus as claimed in claim 1, wherein each of the plurality of devices receives one of the plurality of device driving programs directly from the storage unit.

5. The apparatus as claimed in claim 1, wherein the storage unit comprises a nonvolatile memory.

6. The apparatus as claimed in claim 1, wherein the plurality of devices comprises:
   a broadcasting receiving unit; and
   a graphical user interface generating unit.

7. A digital broadcasting apparatus, comprising:
   a plurality of processors to launch one of a plurality of device driving programs received from a storage unit;
   the storage unit to store the plurality of device driving programs corresponding to a plurality of devices that are bootable;
   a control unit to upload the plurality of device driving programs from the storage unit to the plurality of devices, each of the plurality of devices to generate a program request signal which is used by the control unit to upload a corresponding one of the device driving programs,
   wherein each of the plurality of device driving programs comprise at least one program to boot the plurality of devices and a plurality of programs to operate the plurality of devices.

8. The apparatus as claimed in claim 7, wherein, while one of the plurality of device driving programs is being transferred to one of the plurality of devices, the control unit transfers another device driving program to another one of the plurality of devices.

9. The apparatus as claimed in claim 7, wherein each of the plurality of devices is configured to launch one of the plurality of device driving programs received from the storage unit.

10. The apparatus as claimed in claim 7, wherein the plurality of device driving programs comprise:
    a plurality of programs to boot the plurality of devices and a plurality of programs to operate the plurality of devices.

11. The apparatus as claimed in claim 7, wherein each of the plurality of devices receives one of the plurality of device driving programs directly from the storage unit.

12. The apparatus as claimed in claim 7, wherein the storage unit comprises a nonvolatile memory.

13. The apparatus as claimed in claim 7, wherein the plurality of devices comprises:
    a broadcasting receiving unit; and
    a graphical user interface generating unit.

14. A broadcasting receiving apparatus, comprising:
    a plurality of components to process an input signal from an external source;
    a single memory to store data relating to driving of the plurality of components, respectively; and
    a control unit to successively drive at least one of the plurality of components based on the data,
    wherein, while at least one of the data is being transferred to one of the plurality of components, the control unit transfers another data to another one of the plurality of components.

15. The apparatus as claimed in claim 14, the data comprises a plurality of boot programs corresponding to each of the components,
    wherein, while one of the boot programs is being transferred to one of the plurality of
    components, the control unit transfers another boot program to another one of the plurality of components.

16. The apparatus as claimed in claim 14, the data comprises a plurality of operation programs corresponding to each of the components,
    wherein, while one of the operation programs is being transferred to one of the plurality of components, the control unit transfers another operation program to another one of the plurality of components.

17. The apparatus as claimed in claim 14, wherein the memory comprises a nonvolatile memory.

18. The apparatus as claimed in claim 15, wherein the plurality of boot programs comprise at least one of a booting program to boot a broadcast receiving unit, a booting program to boot a broadcast processing unit, a booting program to boot a control unit, and a booting program to boot a graphical user interface (GUI) generating unit.

19. The apparatus as claimed in claim 16, wherein the plurality of operation programs comprises at least one of an operation program to perform operation of at least one of a broadcast receiving unit, a broadcast processing unit, a control unit, and a graphical user interface (GUI) generating unit.

* * * * *